March 23, 1965   M. R. KUEHNLE   3,174,354
TRANSMISSION
Filed Sept. 4, 1962   9 Sheets-Sheet 1
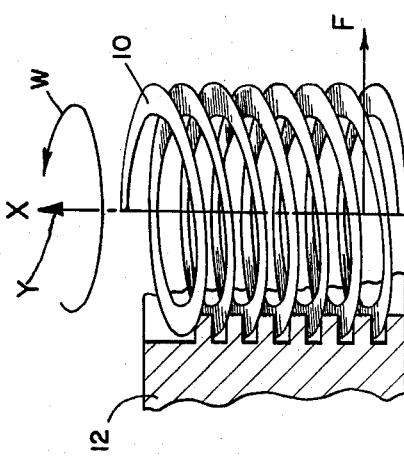
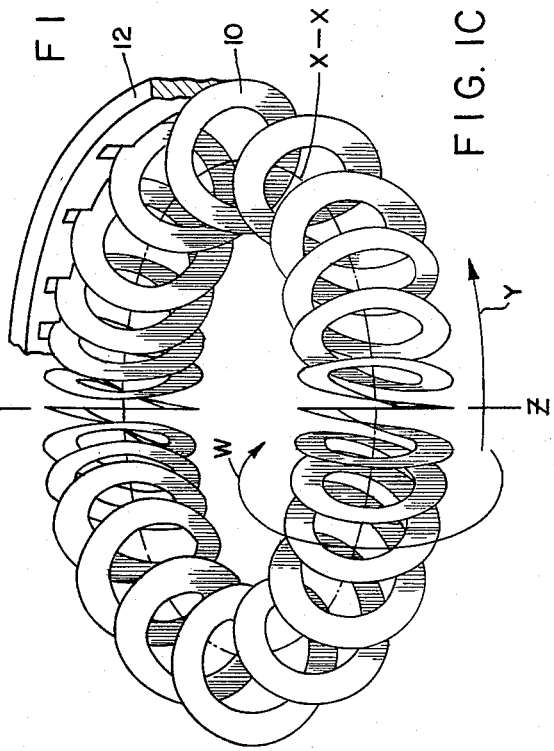
INVENTOR.
MANFRED R. KUEHNLE
BY *Stanley Belsky*
ATTORNEY INVENTOR.
MANFRED R. KUEHNLE
BY Stanley Belsky
ATTORNEY

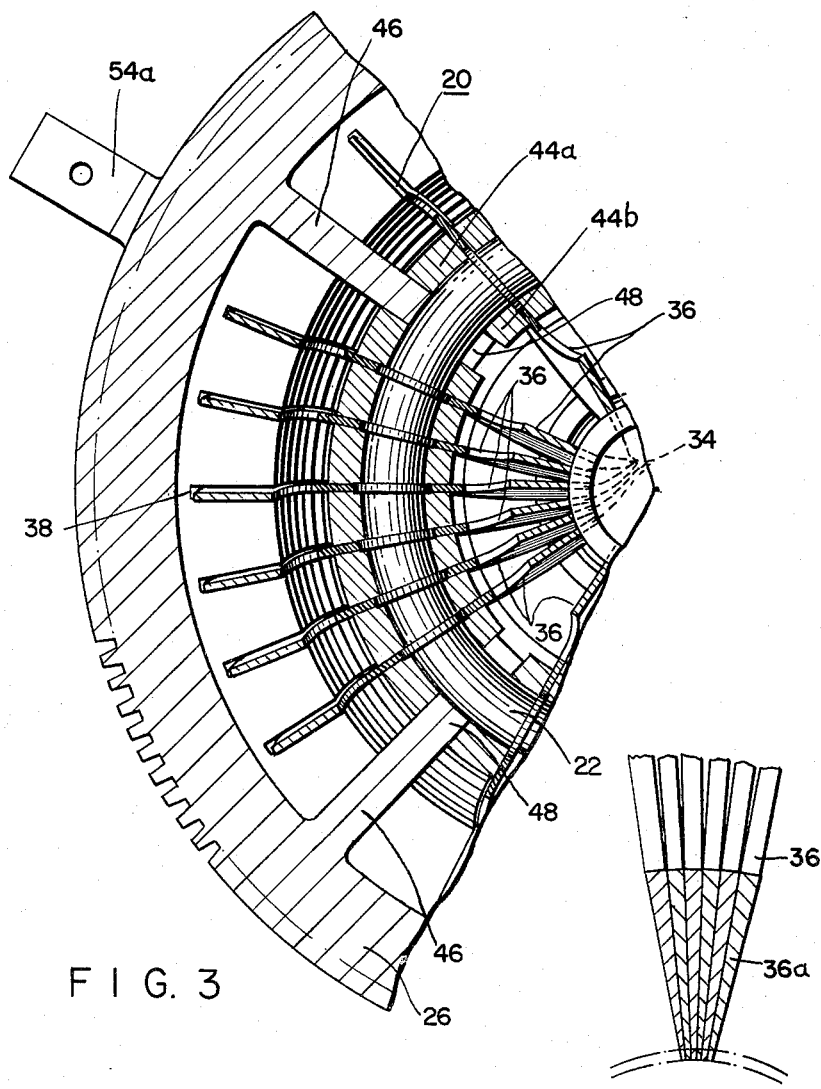

INVENTOR.
MANFRED R. KUEHNLE
BY Stanley Belsky
ATTORNEY

INVENTOR.
MANFRED R. KUEHNLE

INVENTOR.
MANFRED R. KUEHNLE

March 23, 1965  M. R. KUEHNLE  3,174,354
TRANSMISSION

Filed Sept. 4, 1962  9 Sheets-Sheet 7

INVENTOR.
MANFRED R. KUEHNLE
BY Stanley Belsky
ATTORNEY

March 23, 1965     M. R. KUEHNLE     3,174,354
TRANSMISSION

Filed Sept. 4, 1962     9 Sheets-Sheet 9

INVENTOR.
MANFRED R. KUEHNLE
BY *Stanley Belsky*
ATTORNEY

United States Patent Office 3,174,354
Patented Mar. 23, 1965

3,174,354
TRANSMISSION
Manfred R. Kuehnle, Lexington, Mass., assignor to Itek Corporation, Lexington, Mass., a corporation of Delaware
Filed Sept. 4, 1962, Ser. No. 221,288
20 Claims. (Cl. 74—424.5)

The present invention relates to an improved mechanical power transmission. More specifically, it relates to a gear reduction unit incorporating helically wound tape segments having the form of flexible screw threads. The screw thread turns or rotates about an axis which describes a circle, and engagement of the thread with a helical groove structure causes movement of the helix along the circular axis as it is turned around the axis. Power is extracted from the latter movement of the tape by means of a shaft to which the tape is rotatably connected.

This application is a continuation-in-part of my copending application Serial No. 81,621, filed January 9, 1961.

The term "helical", as used herein, refers to a construction of the screw thread type in which successive turns or coils about a linear or curved axis are displaced along the axis. This should be contrasted to a spiral in which successive turns have the same location along the axis and are displaced from each other only in the radial direction.

Prior to the present invention, mechanical gear drive systems have generally been designed with conventional rigid components. The most familiar of these is the standard spur gear, arranged in a variety of configurations. Basically, it consist of hardened teeth on the periphery of a circular metal plate. Gears such as these have been utilized because they provide strength, stable surfaces and accurate spacing between load carrying areas. In addition, these gears are readily produced by well-established machining and material handling methods.

However, in many cases, the advantages of spur gears are offset by their inherent disadvantages. For example, the use of rigid components has often resulted in: undesirable force concentration on very small contact areas; inefficient material usage and resultant restricted torque-sharing ability due to the carrying of the load by a single gear tooth; high inertia and weight problems; and space-consuming geometry.

Finally, the present day demands for: higher torque/weight ratios for use with small, high speed power sources; high response; and minimal backlash have far outstripped the state of the art in conventional gear design and manufacture. Another drawback stemming from the present-day trend toward size reduction is the overall bulk of a system designed for a large gear reduction ratio. The bulk can be reduced somewhat by using a planetary system, a particularly desirable arrangement when in-line output and input axes are required, but only at the expense of a substantial increase in the number of parts.

The present invention makes use of non-rigid components which are individually flexible, yet exceptionally strong when combined in a unitized package. With the use of non-rigid components, large forces are distributed over the non-rigid areas, allowing each such component to become a load-sharing member of the drive. The result is a compact, efficient drive unit of minimal weight and bulk.

A principal object of the invention is to provide an improved mechanical power transmission capable of a large reduction ratio between its input and output velocities.

Another object is to provide a gear reduction unit characterized by both a relatively small size and a large reduction capability.

A further object of the invention is to provide an improved power transmission characterized by a high torque to weight ratio.

Another object of the invention is to provide a transmission of the above type having an output coaxial with its input: a further object is the provision of an input and output which are coaxial and in line with each other.

A further object of the invention is to provide a transmission of the above type having a variable ratio of input to output velocity.

Yet another object is to provide a transmission of the above type capable of a varying rotational output with a constant rotational input. A more specific object is to provide a transmission of the above type capable of run and dwell operation.

A further object of the invention is to provide a novel engine incorporating the above transmission as an integral part thereof.

Other objects of the invention will in part be obvious and will in part appear hereinafter.

The invention accordingly comprises the features of construction, combinations of elements, and arrangements of parts which will be exemplified in the constructions hereinafter set forth, and the scope of the invention will be indicated in the claims.

For a fuller understanding of the nature and objects of the invention, reference should be had to the following detailed description taken in connection with the accompanying drawings, in which:

FIGS. 1A, 1B, and 1C schematically illustrate the operation of the present invention;

FIG. 3 is a fragmentary sectional view taken along lines 3—3 of FIG. 2;

FIG. 3A is a fragmentary view similar to FIG. 3, showing another construction of the helical tape;

Figure 2:
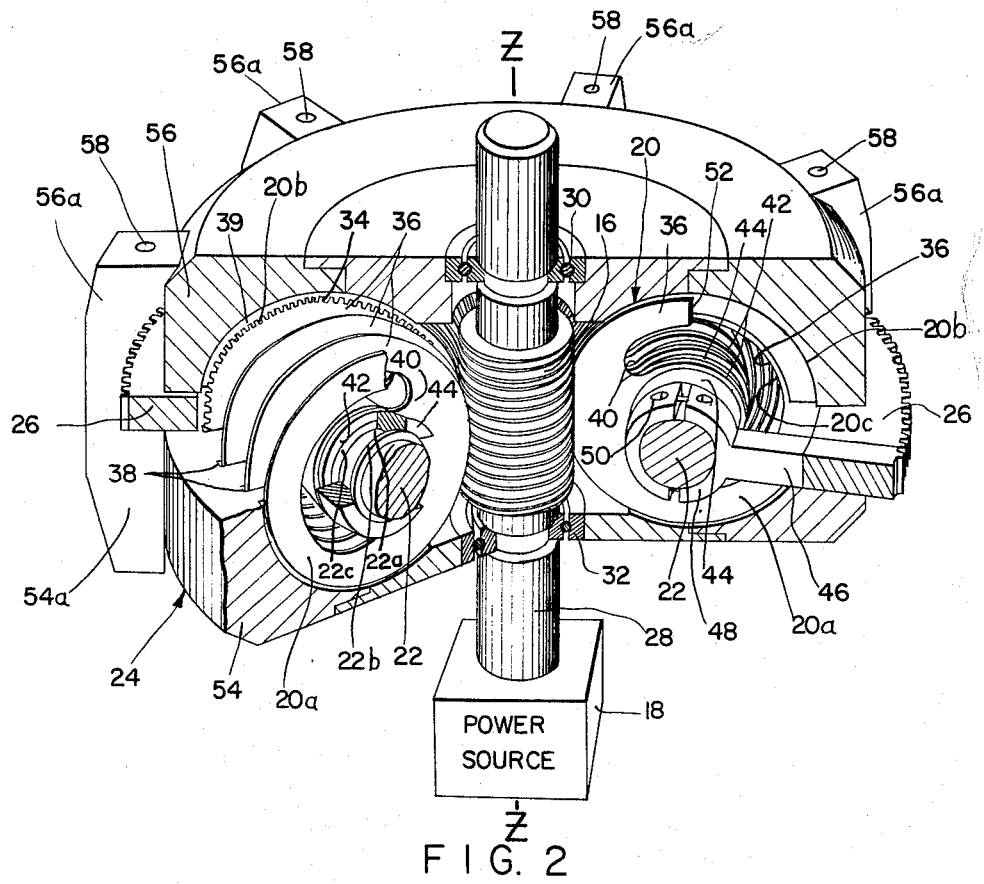
FIG. 2 is a perspective view, partly broken away, of a transmission embodying the invention.

Briefly, the present invention makes use of a helically wound tape having the form of a screw thread. The axis of the helix, i.e., the axis enclosed by each turn thereof, forms a closed curve. In the preferred embodiment, this axis, which may be termed the "axis of rotation," describes a circle.

The turns of the helix are engaged in similarly formed grooves. These grooves bear the same relation to helix as a nut bears to a screw. Thus, if the helix is rotated about the axis of rotation, it advances along this axis and around a second axis which may be termed the "axis of translation." It will be noted that a number of rotations about the rotational axis are required for each revolution around the axis of translation, since, with each rotation, the worm inches along from the groove to the next, again in the manner of a screw turned through a nut.

Preferably, rotation of the helix about the rotational axis is accomplished by means of a worm extending along the translational axis. The worm engages the surfaces or edges of the helical turns facing inwardly toward this axis, these surfaces generally being provided with teeth which mate with the thread of the worm. Thus, with respect to each convolution or turn of the helix, the worm is disposed in a conventional worm and pinion arrangement. It should be noted that here again there is a gear reduction, since a number of turns of the central worm are required for each rotation of the helix.

The worm is the input member of the transmission and the output is taken from a shaft which extends along the axis of rotation. Each turn is coupled to the shaft by means of a spoke affixed to the turn. The spoke is axially fixed with respect to the shaft but free to rotate about it. Therefore, movement of the helix along the axis of rotation, i.e., around the translational axis, brings about a corresponding movement of the shaft. An output member connected to the shaft provides for a rotational output derived from the translational movement of the helix.

As used herein, "worm" is taken to include a screw gearing arrangement as well as a worm gear, inasmuch as the two differ, in their most technical sense, only in such factors as the shape of the wheel teeth and the type of contact between the threads and teeth.

In FIGS. 1A, 1B, and 1C, I have schematically illustrated the principles of operation of the present invention. FIG. 1A shows the operation of a typical helical drive. A circular helix 10 is caused to rotate about an axis X—X by a force F applied tangentially to the helical curve. The force causes the helix to rotate as a body about the axis in the direction of the arrow W. If the helix is supported by a frictionless wall, the locus of each point on the helix defines a circle having a center coincidental with the axis X—X. Thus, for a single rotational input there is a single rotational output.

In FIG. 1B the helix 10 is shown threadedly coupled to a helical stator 12. As the helix is rotated about the axis X—X by the force F, it translates, through interaction with grooves 14, along this axis in the direction of the arrow Y. Thus, we have what is known as a screw motion wherein a single rotational input causes a rotational and translational output. That is, the helix 10 may be compared to a screw turning in a nut analogous to the stator 12.

FIG. 1C illustrates in simplified form a transmission embodying the present invention. The rotational axis X—X now has a circular form, and the helix 10 has a toroid-like configuration. Again, the helix is threadedly coupled to the stator 12, the stator conforming to the helix and thus describing a circle about the central axis Z—Z. Thus, rotation of the helix around the axis X—X by the force F causes the helix to translate as a body along the rotational axis and around the axis Z—Z, which is the translational axis mentioned above. The translation along the curve defines a second rotational mode relative to the precessional axis, and thus the helix 10 exhibits two degrees of rotational output for a single degree of rotational input.

With reference to FIG. 2, a transmission embodying the present invention includes an input section in the form of a worm 16 connected to a source 18 of rotational power; an intermediate section including a helically formed tape 20 coupled to the worm 16 and also to a circular shaft 22; and an output section comprising a grooved housing generally indicated at 24 as well as a ring gear 26 connected to the shaft 22. The input to the transmission is in the form of rotation of the worm 16, and the output is the rotation of the gear 26 relative to the housing 24.

More specifically, the worm 16 is formed on a shaft 28 connected to the power source 18. The shaft is journaled in bearings 30 and 32 secured to the housing 24. Preferably, the bearings 30 and 32 not only provide for rotation of the shaft but also absorb the axial thrust resulting from rotation of the worm in engagement with the tape 20.

The tape 20 preferably has the form of an auger. That is its flat surfaces 20a face along the shaft 22, and its outer and inner edges 20b and 20c face in directions which are radial with respect to this shaft. Teeth 34 formed in the edge 20b mesh with the worm 16, and thus rotation of the worm causes the individual turns 36 of the tape 20 to rotate in unison about the shaft 22.

The outer edges 20b of the tape 20 ride in grooves 38 formed in a toroidal enclosure 39 in the housing 24. The grooves 38 are segments of a continuous internal helical thread in the surface of the enclosure 38. This thread conforms to the edges 20b and thus has the same pitch as the helical tape 20. The theoretically continuous thread has gaps which accommodate the worm 16 and the ring gear 26. Thus, as the tape 20 rotates about the shaft 22 in response to rotation of the worm 16, it threads itself along the grooves 38 and translates around the axis Z—Z.

The tape 20 is coupled to the shaft 22 by means of spokes 40 integral with each of the turns 36. The spokes, in turn, are connected at their inner ends to hubs 42 through which the shaft 22 extends. The hubs are free to rotate around the shaft with the rest of the tape 20, but they are constrained from axial movement along the shaft by means of spacers 44.

More specifically, in the intervals between the hubs 42, the shaft is cut away to form recesses 22a around it. The spacers 44 are bifurcated and shaped to fit over the recessed portions by insertion from outside the shaft 22, i.e., insertion radially inwardly with respect to the axis Z—Z. In a well-known manner, the spacers may be constructed to snap into place so as not to be displaced from the shaft 22 by vibration, etc.

Each of the spacers 44 bears against a shoulder 22c formed by the confluence of a recess 22a of the shaft 22 with the circular surface 22b adjacent thereto, and this prevents translation of the spacers along the shaft. The spacers 44, in turn, constrain the hubs 42 against translational movement along the shaft. Accordingly, as the helical tape 20 winds its way through the grooves 38 and around the axis Z—Z, it carries with it the shaft 22.

As best seen in FIG. 3, each of the spacers 44 has a wedge shape with respect to the plane of the shaft 22. That is, the thickness of each spacer varies from a maximum at its outer end 44a to a minimum at its inner end 44b. The recesses 22a have a similar shape and this prevents the spacers from rotating about the shaft 22. This follows from the fact that any rotation of a spacer would require its thick outer end 44a to pass through a portion of a recess 22a whose width, i.e., axial dimension, is great enough only to accommodate a thinner part of the spacer. Since the end 44a will not fit in this narrow portion of the recess 22a, such rotation cannot take place. The spacer and shaft assembly provide the equivalent of a grooved shaft wherein the grooves have a uniform width to accommodate the hubs of the helically formed tape.

As shown in FIGS. 2 and 3, the ring gear 26 is coupled to the shaft 22 by means of connecting arms 46, each of which are suitably secured to the ring gear at one end. At the other end each arm 46 is fastened to the shaft by means of a conventional split collar 48 tightly held in place by means of bolts 50. As shown at 52 in FIG. 2, the tape 20 is interrupted adjacent to each connecting arm 46. As shown in FIG. 3, the interruption may be of the order of two full helical turns to accommodate the connecting arm.

The purpose of the interruption of the tape 20 will become apparent by considering what would happen if there were no interruption. In such event, rotation of the tape about the shaft 22 would cause it to bear against each connecting arm 46 and tend to move the connecting arm axially along the shaft 22. However, since each connecting arm is locked to the shaft for translational movement therewith, such relative movement between these two parts cannot occur, and therefore the system would jam. With the interruption in the tape 20, no part of it engages the arms 46, and therefore, the arms are free to move with the shaft 22, carrying with them the ring gear 26.

With further reference to FIG. 2, the housing 24 comprises a base 54 and a cap 56 spaced apart to accommodate the ring gear 26 at the outer periphery and to provide for engagement between the tape 20 and the worm 16 along the inner portion of the enclosure 39. The housing is held together by lower and upper ribs 54a and 56a which bridge the gear 26. The ribs, in turn, are fastened together by pins 58.

It should be borne in mind that, although the tape 20 may have substantial thickness, e.g., from 30 mils up to more than two inches, the helix into which the tape is formed is maintained relatively flexible by choosing the proper aspect ratio. This leads to several significant advantages of this type of transmission. In the first place, the helix may be formed initially with a cylindrical envelope, i.e., a straight central axis as in FIG. 1B, and then elastically deformed to conform to the curvature of the shaft 22. The teeth 34 may be formed by first compressing the tape 20 along a straight axis to form a substantially rigid cylinder and then using conventional gear cutting techniques on the surface of this cylinder, i.e., on the surface formed by the succession of turns of the edge 20b.

In this connection it is noted that the part 20 has been called a "tape" because the descriptiveness of this term aids in understanding the operation of the invention. It should be understood that the rectangular cross section commonly attributed to a tape is not necessary to the invention; other cross sections, e.g., square or even circular, may be used. Accordingly, as used herein, "tape" includes parts of all cross sections capable of operation in the manner described.

Further advantages will be apparent from inspection of FIG. 3. As shown therein, each turn 36 of the tape 20 engages the worm 16, and thus the worm transmits forces to all the turns simultaneously. At the same time, each of the turns bears both against a groove 38 and a spacer 44 so that all the turns share in the transmission of the output torque exerted between the housing 24 and the gear 26 via the shaft 22. This multiple point contact throughout the system is due to the spring-like flexibility of the helically formed tape 20, a factor which also eases tolerance problems within the transmission.

This should be contrasted to conventional gears which are rigid and therefore suffer undesirable force concentration on very small contact areas. Moreover, because of the rigidity, the load is generally carried by a single gear tooth. In this connection, it is noted that the flexibility of the tape does not result in a sacrifice of stability. While each turn has a certain amount of flexibility in response to a given force, the net elasticity of the entire tape, which in essence, consists of a large number of turns connected schematically in parallel, is very small. In fact, high torques are easily transmitted by transmissions which are several times smaller in size than prior systems.

It will also be apparent that the transmission is substantially more resistant to sudden load changes which may result in dynamic shock. The rigid gears used in comparable prior systems do not provide a comparable shock absorbing capability.

The total reduction ratio in the present transmission is, as pointed out above, composed of the reduction resulting from the rotation of the tape 20 by the worm 16 and the second stage of reduction resulting from the movement of the tape along the grooves 38. For each turn of the shaft 28, each turn 36 is rotated the distance of one tooth pitch. That is, the gear ratio between the worm 16 and the helical tape 20 is equal to the number of threads on the worm, divided by the number of teeth 34 on one turn 36 of the tape. For each rotation of the tape 20 about the shaft 22, the tape advances by one helical groove 38. Thus, the number of turns required for a full rotation of the tape 20 about the output axis Z—Z is equal to the number of grooves 28. Accordingly, the overall gear ratio of the device is equal to the number of threads in the worm 16 divided by the product of the number of teeth in each helical turn 36 and the number of grooves 38.

Reduction ratios in the range of 1:100 to 1:30,000 are readily obtained with the transmission with a total of only three moving parts.

With further reference to FIG. 3, it might be expected that with the large number of teeth 34 of the individual turns 36 bearing on the worm 16, there would be undue wear on the worm because of the multiplicity of cutting edges presented by the teeth. However, because of the excellent lubrication characteristics of the system, this has been found not to be the case.

More specifically, as shown in FIG. 3, the inner edges of the turns 36 are very close together. In fact, they are preferably in mutually supporting engagement with each other, the dimensions having been exaggerated somewhat in the drawing for the sake of clarity. Thus, from the edges for some distance back along the turns 36 the spaces between the turns are of capillary proportion. Accordingly, lubricating oil within the housing 24 is readily drawn by capillary action along faces of the turns 36 and in toward the teeth 34 where it spreads over the threads on the worm 16 to provide an efficient lubricating film. In other words, the system has a self-pumping feature which carries the lubricant to the engaging surfaces of the teeth 34 and the worm 16. This largely reduces the wear which would otherwise be expected to occur.

FIG. 3A illustrates how the turns 36 may be shaped to provide a substantial mutual supporting relationship between them. The turns are tapered along their peripheries as shown at 36a. The angles of the tapers are such as to provide engagement for a considerable distance along them extending from their innermost points. That is, the engagement is along radii of the circle defined by the shaft 22. The contact provides for transmission of substantial forces directly between adjacent turns and this tends to ensure even distribution of axial forces (i.e., along the shaft 22) among all the turns 36.

Figure 4A:
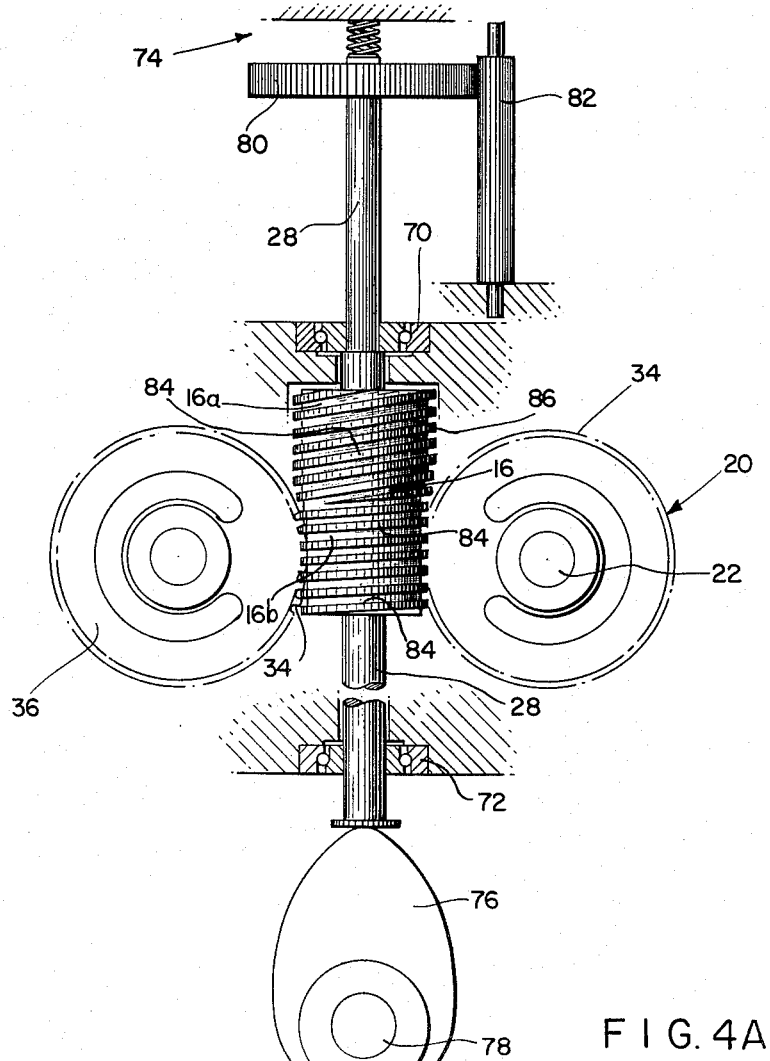
FIG. 4A is a side view, partly in section, of a transmission having a variable output-to-input ratio.

In FIG. 4A I have illustrated in simplified form a transmission of the above type capable of a change in the reduction ratio. The shaft 28 is journaled in bearings 70 and 72 which permit axial movement of the shaft through them. A spring system schematically indicated at 74 urges the shaft against a cam 76 mounted for rotation on a shaft 78. A pinion 80 affixed to the shaft 28 meshes with a second gear 82 which provides the input power of the transmission. The gear 82 is elongated so as to mesh with the pinion 80 regardless of the axial position of the shaft 28.

The worm 16 carried by the shaft 28 of FIG. 4A has a thread 84 provided with a first pitch at the lower end of the worm and a second pitch greater than the first pitch at the upper end thereof. Specifically, at the lower end, the pitch of the thread 84 corresponds to a single tooth 34 on the helical tape 20. At the upper end it corresponds to a distance of two teeth 34, and a second thread 86 has been added at this end to provide for proper engagement of this portion of the worm with the teeth.

Thus, with the shaft and worm positioned as illustrated, the turns ratio between the worm 16 and the helical tape 20 is equal to the number of teeth 34 on each turn 36 of the tape. When the shaft 78 is rotated to permit the shaft 28 and the worm 16 to descend, the upper portion of the thread 84 and the thread 86 engage the teeth 34. Since the number of threads engaging the teeth 34 is now doubled, the reduction ratio is changed by a factor of two, i.e., it is now equal to the number of teeth 34 per turn 36 divided by 2. It will be apparent that further changes in the gear ratio can be accomplished with different relative numbers of threads at the lower and upper portions of the worm 16. Moreover, more than two different ratios can be provided by simply lengthening the worm and providing more than two portions having different numbers of threads.

Figure 4C:
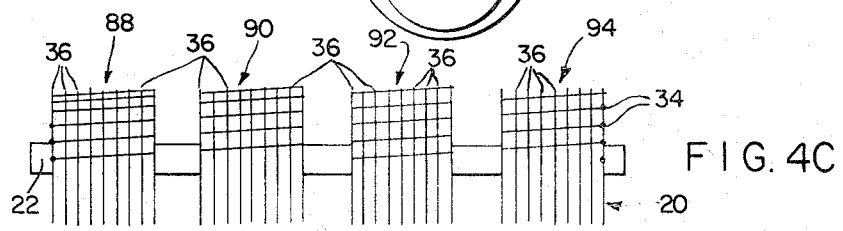
FIGS 4B and 4C are schematic representations of the helical thread corresponding to different output-to-input ratios.
Figure 4B:
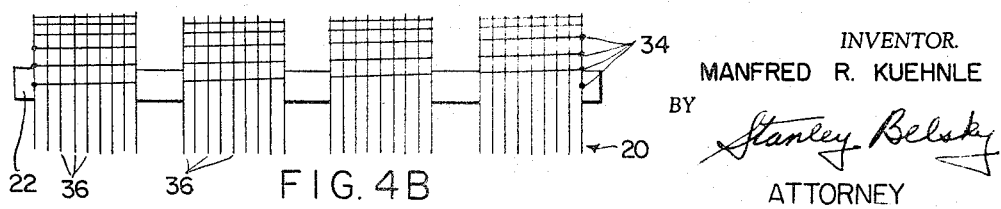

FIGS. 4B and 4C present in unfolded form views of the helical tape 20 as seen from the worm 16. FIG. 4B corresponds to the disposition of the tape 20 when the worm 16 is in the position shown in FIG. 4A, and FIG. 4C represents the tape when the worm 16 has dropped down so that both threads 84 and 86 engage the teeth 34.

As shown in FIG. 4B, each row of teeth extends diagonally across the edges of the turns 36, and, at its ends, the row is horizontally in line with the opposite end of the next adjacent row. Thus, when the tape 20 is formed into a torus around the worm 16 of FIG. 4A, the rows of teeth define a helix conforming to the thread 84.

When the shaft 28 of FIG. 4A descends, the rows of teeth 34 acquire a steeper inclination as shown in FIG. 4C. Each end of a row is again at the same horizontal level as the opposite end of another row of teeth; but, in this case, the second row is not the adjacent row but the next following row of teeth. Thus, when the toroidal shape is given to the configuration of FIG. 4C, the rows of teeth form two helices, each of which has twice the pitch of the corresponding helix formed from FIG. 4B. This double helix fits the double thread configuration (FIG. 4) of the threads 86 and 84.

In order to change from the configuration of FIG. 4B to that of FIG. 4C, the helical tape 20 must in effect be twisted around the shaft 22. Parenthetically, it is noted that the amount of twisting is such as to displace one end of the unfolded helix in FIGS. 4B and 4C by an integral number of teeth with respect to the other end. This twisting is readily accomplished in spite of the rigidity of the tape in the plane of the face thereof, by means of a corresponding expansion or contraction of the helix. That is, it is well known that a helix can be twisted relatively easily as long as it is free to undergo a corresponding change in pitch.

If the tape 20 were formed as a single continuous toroidal unit, pitch variation could not be accomplished in the above manner. Specifically, the required displacement of one end of FIG. 4B by one tooth 34 with respect to the other end in order to arrive at FIG. 4C could not take place with the two ends joined together. Moreover, the net pitch change required for twisting could not be obtained in a continuous unit.

However, with the tape 20 divided into a plurality of sections, as indicated at 88, 90, 92 and 94 in FIGS. 4B and 4C, these difficulties are overcome. The ends of each section can be rotatably displaced with respect to each other, i.e., the sections 88–94 can be twisted, and moreover the sections are separately rotatable about the shaft 22, given the above construction, so that the rows of teeth 34 thereon fall into alignment with each other. Also, the slight change in pitch required for twisting is easily obtainable by virtue of the fact that the grooves 38 (FIG. 3) are slightly wider than the thickness of the tape 20, thereby permitting some axial movement of the turns 36 with respect to the grooves. Also to be considered in this connection is the relative flexibility of the tape 20 for bending about axes perpendicular to the helical axis, i.e., perpendicular to the shaft 22.

In general, it will be preferable to change the diameter of the worm when the lead is altered. Specifically, when the lead is increased, the diameter is generally also increased. Accordingly, the diameter of the upper portion 16a of the worm in FIG. 4A is somewhat greater than that of the lower portion 16b.

The increase in worm diameter is accommodated to a large extent by twisting the tape 20 in the direction which unwinds the helix defined by it. There is a corresponding decrease in the diameter of each turn 36 so that the teeth 34 are retracted toward the shaft 22. This provides room for the increased worm diameter.

Figure 5:
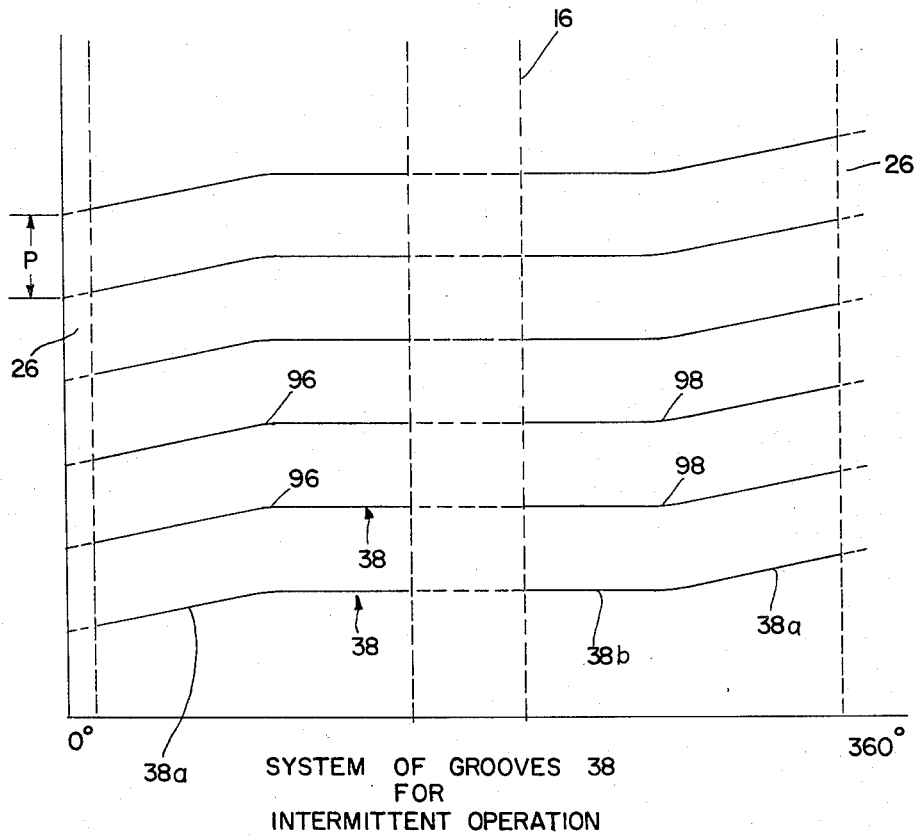
FIG. 5 is a schematic illustration of the groove system in a transmission designed for run and dwell operation.

FIG. 5 illustrates in schematic form how intermittent, or run and dwell, operation can be obtained from a transmission of the above type. This figure is a schematic development of a portion of the interior of the enclosure 39 of FIG. 2, and, in particular, it shows the arrangement of the grooves 38 for such operation. In a transmission having a continuous output, the grooves form a helical system within the enclosure 39 as described above, and in FIG. 5 they would be represented by a series of diagonal lines extending across the figure, separated by a distance P, the pitch of the grooves. For intermittent operation, on the other hand, the grooves have inclined portions 38a corresponding to advance or run of the output of the transmission, and horizontal portions 38b corresponding to dwell of the system.

The operation of the intermittent system is best understood by referring first to FIG. 2, and particularly to the system by which the helical tape 20 is connected to the shaft 22. The force is transmitted by means of the spokes 40, and thus axial movement of the shaft is responsive mostly to the corresponding movement of the portions of the tape 20 immediately adjacent to the spokes. Because of the flexibility of the tape, the portions thereof remote from the spokes may be axially displaced by a considerable distance with respect to the spokes.

With reference again to FIG. 5, it will now be apparent that when the portions of the tape 20 adjacent to the spokes are moving along the portions 38a of the grooves 38, the spokes advance, carrying the shaft 22 (FIG. 2) and ring gear 26 with them. On the other hand, when these portions of the helical tape pass through the portion 38b of the grooves, there is no forward motion of the spokes, and therefore, the shaft 22 is at rest. Thus, there is intermittent movement of the shaft 22 as the force-producing parts of the helical tape 20 pass alternately through the groove portions 38a and 38b.

It should be borne in mind that, with the groove configuration of FIG. 5, the groove pitch is equal to the pitch of the helical tape 20, just as in a continuously running transmission. This is because of the fact that, while various portions of each helical turn 36 (FIG. 2) may be distorted out of a true helical configuration, the spacing between the turns is fixed by the spacers 44 on the shaft 22. With this fixed spacing, the distance from one spoke 40 to the next, and correspondingly the distance between successive portions of the tape 20 adjacent to the spokes, is also substantially fixed. Thus, the spacing between corresponding points on successive grooves 38 must conform to the inter-spoke spacing, i.e., the pitch of the helix.

As pointed out above, the groove system accommodating the edge of the tape 20 is interrupted by the spaces provided for the worm 16 and ring gear 26 of FIG. 2. These interruptions are indicated by the dash lines in FIG. 5, and, as shown therein, they preferably occur in portions of constant pitch. That is, it is preferable that the changes in pitch at 96 and 98 not coincide with the groove interruptions. Otherwise, the lead portions of each section of the tape 20, e.g., the interruption 52 of FIG. 2, might not follow the change of pitch, resulting in jamming when these portions turn through a groove interruption.

In the discussion of FIG. 5 it was tacitly assumed that the spokes 40 (FIG. 2) rotate in circles which are perpendicular to the shaft 22 and thus parallel to the groove portions 38b. Therefore, when they pass along the portions 38b no forces perpendicular to these portions, i.e., along the shaft 22, are generated. Thus, it is the angular relationship between the circles around the shaft 22 described by the spokes 40 and the various portions of the groove 38 which determine the rates of advance of the shaft 22. These rates can be varied by changing the angle of the "spoke circle" with respect to the shaft instead of changing the lead angles of various portions of the groove 38.

More specifically, if the hubs 42 and spacers 44 (FIGS. 2 and 3) are cocked with respect to the shaft 22 so that the spokes 40 rotate in circles parallel to the portions 38a of the groove 38, the shaft 22 will dwell when the spokes pass these portions and run when they pass the portions 38b. It will be noted that if the groove 38 describes a helix throughout, even a slight cocking of the "spoke circles" can cause intermittent operation, since the circles will be parallel (or tangent) to the groove a single point on each turn thereof.

The intermittent arrangement shown in FIG. 5 is but one example of an output whose speed varies periodically with a constant input speed. It is also possible to provide continuous forward motion with a periodically varying rate. With reference to FIG. 5, this can be accomplished by providing the groove portions 38b with a finite lead angle different from the lead angle of the portions 38a. In fact, the output may even be periodically reversed in direction, though having an overall movement in the forward direction, by given the portions 38b a negative lead angle.

The discussion relating to FIG. 5 points up another characteristic of the transmission. The force which a turn 36 (FIG. 2) of the helical tape can transmit is less when the spoke 40 of the turn passes through the gaps in the grooves 38 defined by the gear 26, for example, than in unbroken portions of the groove. This results from the fact that when a spoke passes through a gap, the area of contact between the groove and the force transmitting portion of the turn 36 adjacent to the spoke is diminished. Therefore, I prefer to stagger the spokes with respect to their angular positions around the shaft 22. With this arrangement, only a few spokes are passing through gaps in the groove 38 at any given time and the torque transmittable by the system is thus materially greater than it would be if the spokes were aligned with each other.

It should be noted that staggering of the spokes 40 is generally not preferred in an intermittent system because of the resulting complexity of the groove 38.

Staggering of the spokes 40 is particularly desirable when the gaps in the groove 38 become predominant. For example, in FIG. 9 the grooves 38 extend along only a small portion of the periphery of each turn of the helical tape 20. It will be apparent that if a set of aligned spokes were used in this system, the torque exertable by the tape would be materially less when the spokes were opposite the grooves than when they passed over the grooves.

Figure 9:
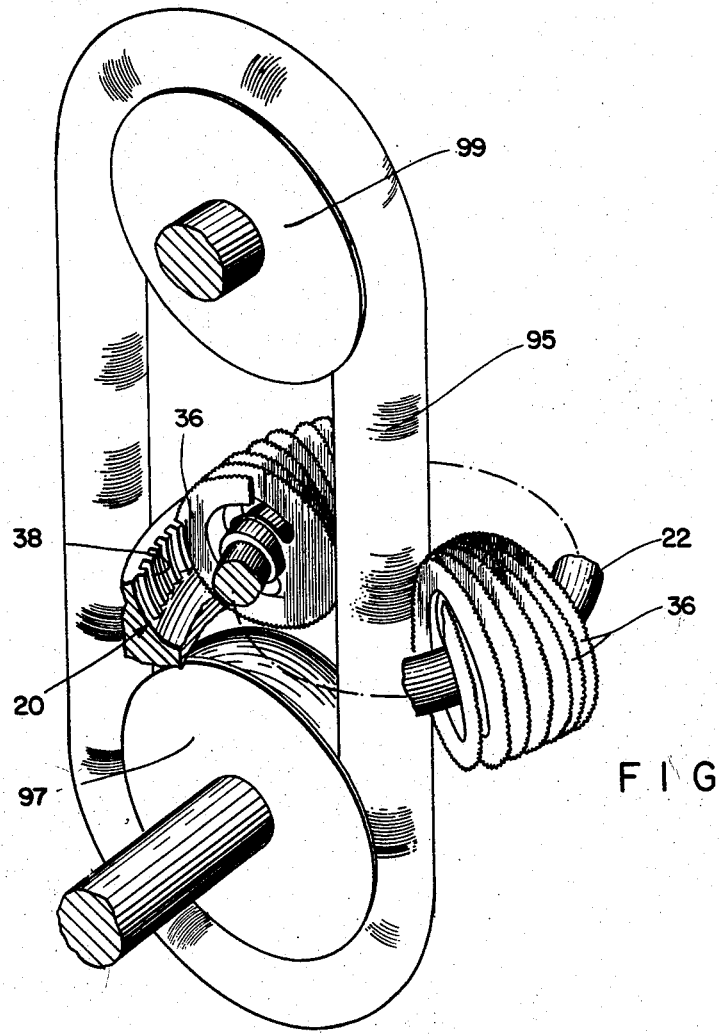
FIG. 9 is a simplified perspective view of another embodiment of the invention using a frictional input drive.

FIG. 9 also illustrates that the lengths of the grooves 38 may be as short as desired, subject, of course, to a diminution of the torque capability of the system. In fact, the ridges or projections between the grooves might take the form of pins, with the system of grooves and ridges resembling a comb.

When the grooves 38 become short, they serve as force transmitting elements, but not as guiding surfaces for the helical tape 20. In such case, the tape itself must have a helical form. More accurately, the leading end of each section of tape must be spaced from the corresponding point on the next succeeding turn by the distance between adjacent grooves 38. Otherwise the tape will not thread its way along the groove system as it is rotated. This in turn leads to the requirement that each section of tape 20 have a length of at least one turn if the grooves 38 are very short. To generalize, each section must be at least long enough to bridge the gaps in the grooves.

As a corollary, given a substantially continuous groove system, each section of tape 20 may have a length of less than one turn, the ultimate length being the width of a spoke 40, as long as means are provided to rotate all the sections in unison.

Thus, it is seen that while the lengths of the sections of tape 20 and the lengths of the grooves 38 may vary, there is a required relationship between these two parameters. That is, they must be so related that the tape sections can undergo a screw thread type of movement from groove to groove, inching along around the axis of translation Z—Z (FIG. 2).

In FIG. 9, I have shown a linear drive which may be used in place of the rotating worm described above. A belt 95 passing along the central axis of the transmission is supported on a drive pulley 97 and an idler pulley 99. The belt 95 engages all the turns 36 of the tape 20 and movement of the belt over the pulleys causes rotation of the turns 36 by means of friction. If desired, the belt may be provided with a ringed periphery which mates with teeth 34 on the tape 20 for a more positive engagement.

The linear drive may also be constructed without the preformed teeth 34 on the tape 20. For example, the belt 95 and tape 20 may be made of materials having a high coefficient of friction between them, in which case even relatively smooth engaging surfaces on the belt and tape will transmit the required forces.

Another construction of a linear drive involves the use of a deformable, plastic material at the outer edge 20b of the tape 20. The belt 95 is provided with a relatively hard, ringed periphery which "bites into" or embosses the plastic edge 20b, thereby forming teeth therein which mate with the surface of the belt. This method of forming teeth on the tape edge 20b can be extended to the use of a rotary worm drive, in which case the worm thread embosses teeth on a previous smooth tape edge.

Figure 6:
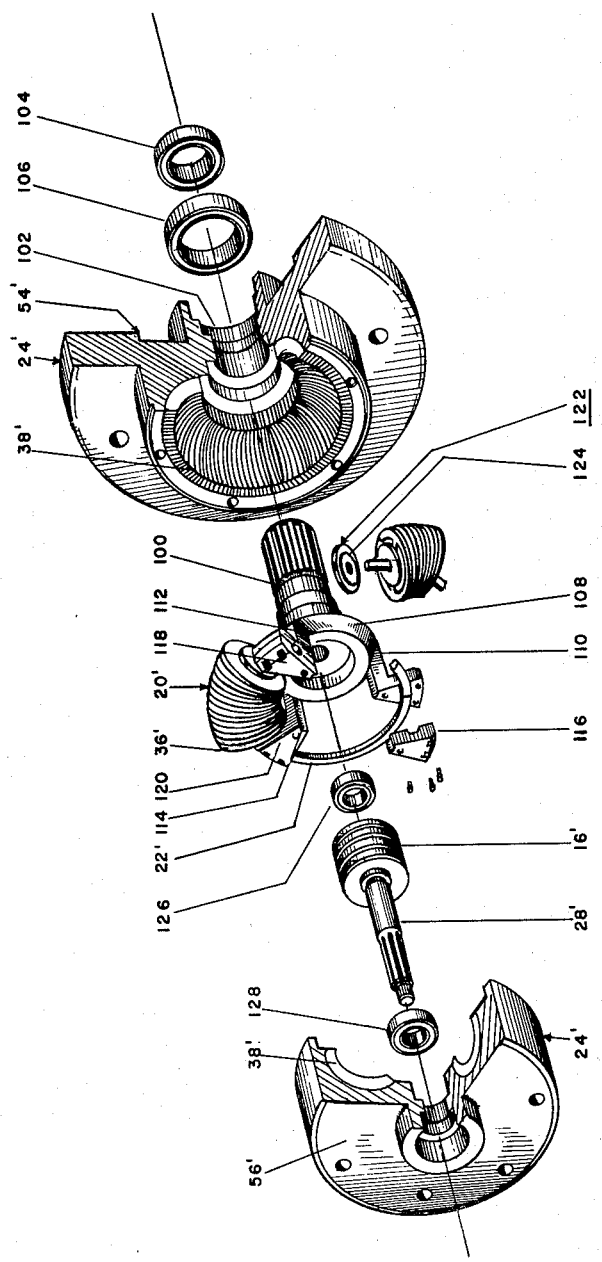
FIG. 6 is an exploded view, partly broken away, of a transmission having input and output shafts in line with each other.

FIG. 6 is an illustration of a transmission whose output axis is in line with its input axis. This transmission is generally similar to the one illustrated in FIGS. 2 and 3, and therefore, corresponding parts have the same reference numerals, with the addition of a prime suffix. The output torque is taken from a splined shaft 100, which extends through an aperture 102 in the base 54' of the housing 24'. The shaft 100, which is journaled in a pair of bearings 104 and 106 suitably fitted within the aperture 102, carries a hub 108 supporting the helical tape 20'.

More specifically, three lugs 110, 112 and 114, extending from the hub 108, carry the shaft 22' on which the tape 20' is mounted. Preferably, the shaft 22', which is clamped to the lugs 110–114 by clamps 116–120, is in three sections to facilitate assembly of the unit. Moreover, the shaft may have a square or other non-circular cross section as shown, interfitting with the holes in the spacers disposed between the helical turns 36' of tape 20', one of the spacers being indicated generally at 112. Thus, the spacer 122 has a substantially square aperture fitting the shaft 22'. This keeps it from rotating on the shaft and thus maintains its thick and thin portions in proper alignment. The spacer also has a raised circular central portion 124 which fits within the central aperture in a hub 42' (not shown) of one of the tape turns 36'. This facilitates rotation of the tape 20' around the square shaft 22' while permitting use of the square cross section for the above-mentioned alignment of the spacers.

With further reference to FIG. 6, the shaft 28' carrying the worm 16' is journaled in a bearing 126 fitted into the hub 108 and a bearing 128 fitting within the cap 56' of the housing 24'.

The construction of FIG. 6 has another advantage in addition to its in-line output. No gap between the cap 56' and base 54' is required for the accommodation of a member such as the ring gear 26 of FIG. 2. Therefore, there is no interruption of the grooves 38' in this region.

Figure 7:
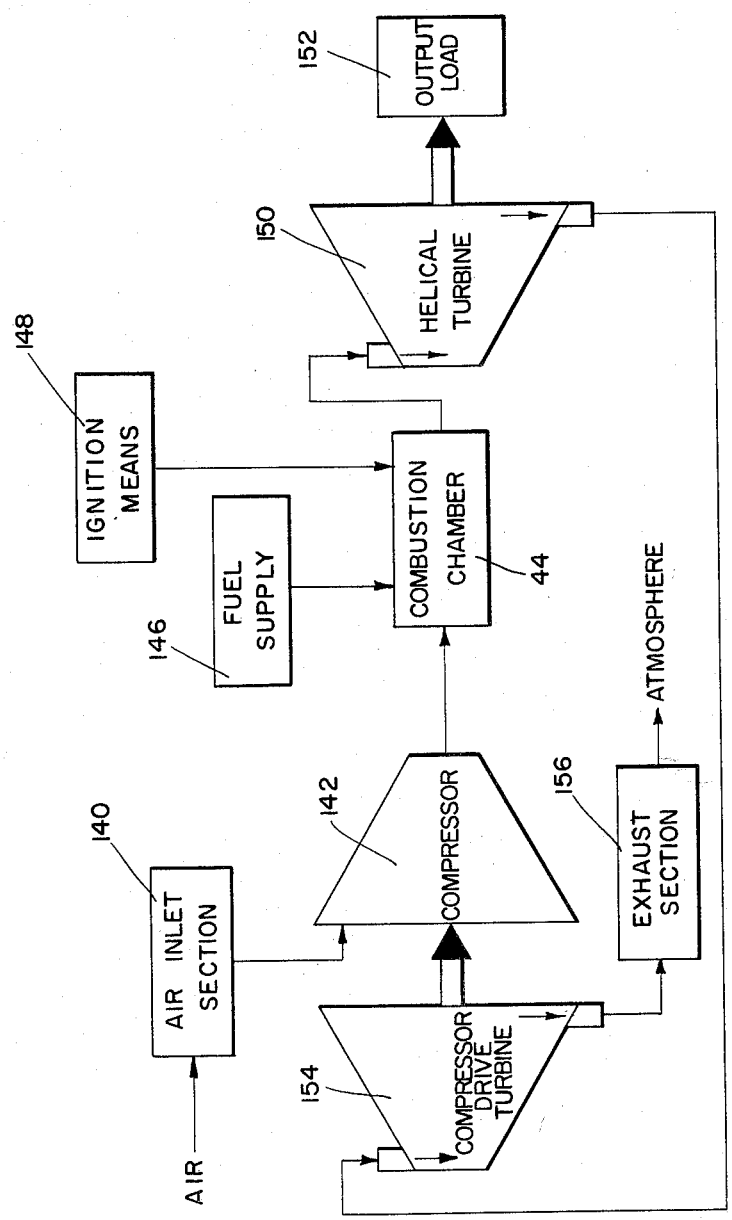
FIG. 7 is a schematic diagram of a gas turbine engine embodying the invention.
Figure 8:
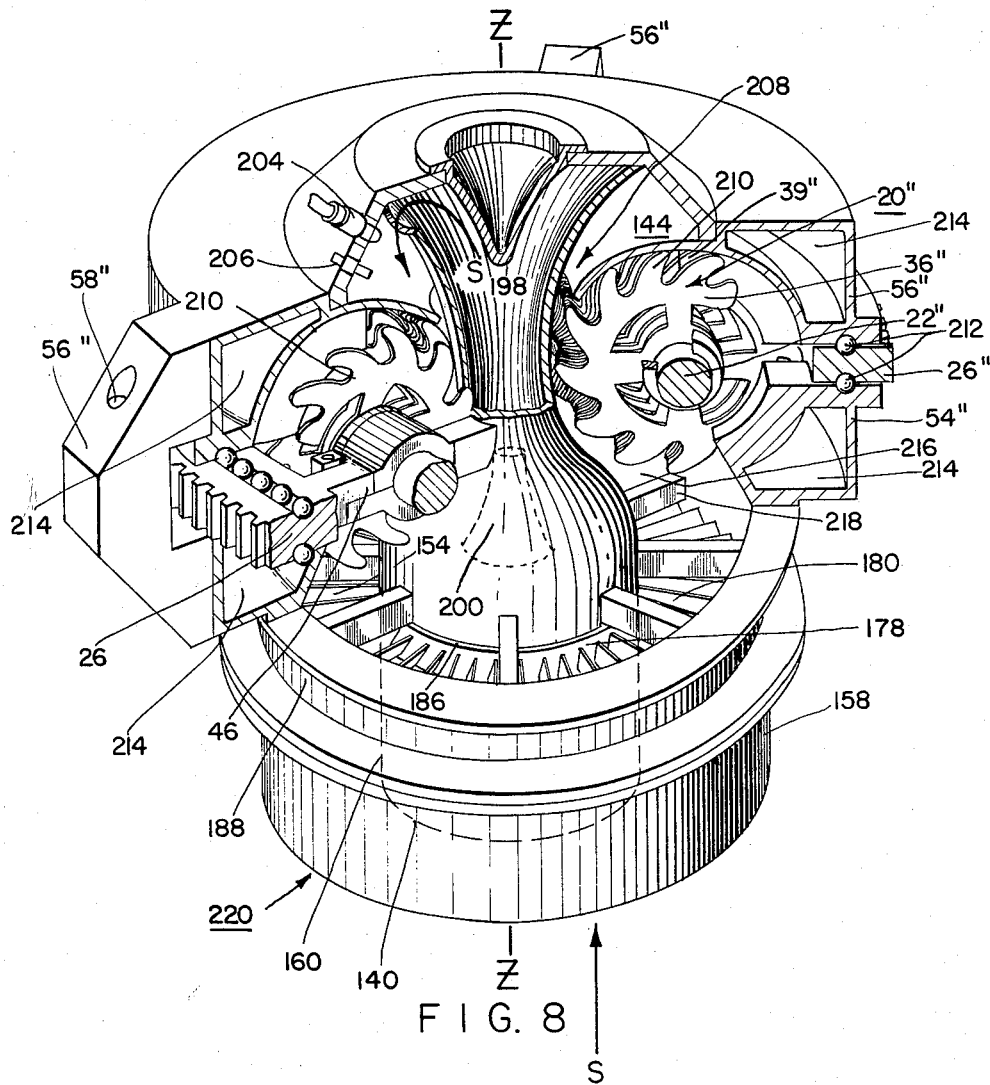
FIG. 8 is a perspective view, partly broken away, of the engine illustrated in FIG. 7.

In FIGS. 7 and 8, I have illustrated a gas turbine embodying the invention. The turbine includes a transmission generally similar to the one illustrated in FIGS. 2 and 3. Accordingly, corresponding parts are again indicated by identical reference numerals, this time with the addition of a double prime suffix. The principal distinction between this embodiment and the transmission shown in FIGS. 2 and 3 is in the manner of applying the tangential force to the helically wound tape 20". In the transmission of FIG. 2, the tape 20 has gear teeth 34 disposed about its periphery, and the tangential force is applied by means of the worm gear 16 which meshes with the teeth. In the turbine, the tape 20" has impeller blades 210 disposed about its periphery and the tangential forces are applied by high velocity gases impinging on the blades. Application of the tangential force to the tape causes the element to rotate and translate in the same manner as in the transmission previously described.

In FIG. 7 I have schematically illustrated in block diagram form the major components of the gas turbine and their functional interrelation. As shown, air enters the engine through an air inlet section 140 and flows to a compressor 142 where it is compressed. The compressed air flows to a combustion chamber 144 where it is mixed with fuel entering the combustion chamber from a fuel supply 146. The fuel-air mixture is ignited by an igniter 148 coupled to the combustion chamber. The heated gas flows to a helical turbine 150 whose operation will be described in detail hereinafter. The helical turbine is mechanically coupled to a load 152 whose form is dependent on the desired end use of the apparatus. Gas leaving the helical turbine 150 flows to a compressor drive turbine 154 which is mechanically coupled to the compressor 142 for driving it. Exhaust gas leaving the compressor drive turbine 154 flows to an exhaust section 156 where it is discharged to the atmosphere.

FIG. 8 is a perspective view, partially broken away, of the gas turbine engine. In this drawing the direction of air and gas flow is indicated by the arrows S. For convenience of explanation, the terms "downstream" and "upstream" as used hereinafter will refer to the direction of gas or air flow through the component being described.

The engine includes a housing 158 having two concentric air passages therein, including the air inlet section 140. The inlet section 140 includes a cylindrical duct 160 containing the compressor 142. The compressor, whose details are not shown, may be a conventional two-stage axial flow unit. It is driven by turbine rotor blades 180 mounted on a drive ring 178.

A central duct 198 guides the air from the compressor to the combustion chamber 144. Within the duct and downstream of the compressor is a fixed hub 200 in which the compressor rotor (not shown) is journaled. Located at the downstream end of the duct 198 there are a plurality of openings communicating with the combustion chamber 144. Circumferentially spaced along the wall of the combustion chamber are fuel nozzles 204 coupled to a fuel supply (not shown), and igniters 206. The fuel nozzles and igniters may be any of the types well known in the art suitable for this purpose. For the sake of clarity only a single igniter and fuel nozzle have been shown, it being understood that the number and actual disposition of the elements would be dependent upon the turbine performance characteristics.

At the downstream end of the combustion chamber 144 there are orifices 208 coupling the combustion chamber to the transmission section.

The transmission section includes the turbine 150, which takes the form of a helical tape 20" similar to the tape 20 of FIG. 2. Impeller blades 210 are formed around the edges of the helical turns 36" so that each of the turns may be driven by fluid forces impinging on the impeller blades. At the inner diameter of the toroid the impeller blades 210 are closely packed (as are the gear teeth 34 in FIG. 3, as discussed above). Thus, the maximum effective blade area is exposed to incoming gas flowing through the orifices 208.

The gases impinging on the impeller blades 210 cause rotation of the helical tape 20" about the shaft 22" in the same manner that the worm 16 of FIG. 2 rotates the helical tape 20 therein. Similarly, the tape 20" turns along helical grooves in the toroidal chamber 39" formed in the housing 24" to bring about rotation of the shaft 22" about the axis Z—Z. The shaft 22" in turn is connected to a ring gear 26" by connecting arms 46". A ball bearing system indicated at 212 may be disposed between the gear 26" and the base and cap 54" and 56" of the housing 24".

The housing 24" and the helical tape 20" are cooled by air flowing through annular ducts 214. Cooling air may be obtained from an auxiliary supply, not shown, or bled from the compressor as desired. This illustrates another feature common to both the engine of FIG. 8 and the transmissions of FIGS. 2 and 6. In each case, heat is generated in the central closely packed portion of the helical tape. However, this heat is readily conducted away from this central portion by the turns of the tape, which, in effect, act as cooling bins transmitting the heat to coolant fluids, i.e., air in the engine and oil in the transmission. Of equal importance is the fact that, with the rotation of the helical tape about the shafts 20 and 20", the heated portions of the tape are rapidly transported away to cooler regions of the housing and replaced by cooled portions. In the outer portions of the tape where the separation between turns is greatest, the volume per turn is greatest, and heat is therefore more readily dissipated.

The downstream region of the toroidal enclosure 39" opens into an annular passageway 216 around the duct 198. This passageway communicates with a turbine inlet stator section which includes a plurality of guide vanes (not shown) extending between the duct 198 and a housing wall 188. Gas flowing downwardly through these inlet guide vanes flows through the compressor drive turbine rotor blades 180 to an exhaust duct 220. The exhaust duct is an annulus bounded by the duct 160 and the housing 158. The concentric disposition of the inlet duct and exhaust duct provide counterflow heating of the inlet air as can be seen by the arrows.

The overall operation of the engine is as follows. Air entering through the air inlet section 140 flows through the inlet duct 160 and into the compressor housed therein. The compressed air then flows through the duct 198 to the combustion chamber 144.

Fuel from a fuel supply (not shown) is injected into the combustion chamber through fuel nozzles 204 where it is mixed with air flowing therethrough. The fuel-air mixture is ignited by appropriately placed igniters 206 in the combustion chamber. The heated gas flows through orifices 208 where it is expanded, to the impeller blades 210 formed on the helical tape 20". The high velocity air exiting from the combustion chamber 144 applies a force component tangent to the tape 20" with resulting motions of the type described above. The impeller blades 84' and orifices 208 are so disposed in the preferred embodiment that each helical turn 36" of the turbine is equally loaded.

It will be apparent that other means of driving the turbine may be used by modifying the apparatus shown, as is known in the art. For example, with slight modification, the turbine could be driven by steam, water, or other fluids, compressible or incompressible. It will also be apparent that the impeller blades need not be disposed about the edge of the tape 20", as shown, but could be placed anywhere along the periphery of the turbine. For example, it may be desirable in certain applications, such as a water turbine, to have buckets disposed on the faces of the tape rather than on its edges.

The gas leaving the endless turbine blades 210 flows through blades 180. The rotor blades are mounted in the ring 178 coupled to the compressor rotor, whereby rotation of blades 180 by the gases flowing against them causes the compressor rotor to rotate. Gas leaving the compressor drive turbine flows through an exhaust duct 220 to the atmosphere.

As with the transmissions of FIGS. 2 and 4, the turbine illustrated herein is not limited to a circular construction about the axis Z—Z, as illustrated in FIG. 2, but is broadly applicable to closed curves other than circles. In order to adapt this device for other curves it may be desirable, for example, to make the shafts 22 and the output gears 26 non-rigid, thereby to allow motion along any desired shape of curve.

It will thus be seen that the objects set forth above among those made apparent from the preceding description, are efficiently attained and, since certain changes may be made in the above constructions without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention, which, as a matter of language, might be said to fall therebetween.

What is claimed is:

1. An apparatus for transmission of motion or force, comprising:
 first output means having a plurality of guide surfaces, each of said surfaces intersecting a common endless helical curve for guiding motion along said curve;
 movable linkage means including a member formed substantially in the shape of a flexible helical curve, said member bearing on said guide surfaces for movement therealong and along said endless curve;
 driving means coupled to said linkage means member adapting said member for said movement; and
 second output means coupled to said linkage means member for motion therewith with respect to said first output means, thereby providing said transmission.

2. An apparatus for transmission of motion or force, comprising:
 first output means having a plurality of guide surfaces, each of said surfaces intersecting a common endless helical curve for guiding motion along said curve defining a torus having an axis of revolution;
 movable linkage means including a member formed substantially in the shape of a flexible helical curve bearing on said guide surfaces to simultaneously provide motion therealong and along said curve as well as rotation about said axis;
 driving means coupled to said linkage means for causing motion thereof along said guide surfaces; and
 second output means coupled to said linkage means for rotation therewith about said axis with respect to said first output means.

3. The combination of claim 2 wherein said driving means is rotatable about said axis, thereby providing a coaxial transmission.

4. A transmisison comprising:
 first output means including a first member having a series of projections successively spaced apart along a closed first path;
 a screw member engaging said projections and adapted thereby to advance along said path in screw-like manner, said screw member being flexible so that successive turns thereof engage successive projections,
 input means for rotating said screw member about an axis extending in the direction of said path, thereby to advance said screw member along said path; second output means; and
 means coupling said screw member to said second output means for relative rotation between said screw member and said second output means about said axis, whereby said second output means is driven by said screw member, with respect to said first output means, in a second path similar to said first path.

5. The combination defined in claim 4 in which said input means continuously rotates said screw member a plurality of revolutions about said axis, and said second output means is connected to said coupling means at a point axially removed from said screw member along said axis, whereby said screw member rotates about said axis freely without interfering with said output means.

6. The combination defined in claim 4 in which said coupling means includes a shaft extending generally along said axis;
 means connecting said screw member to said shaft for rotation around said shaft; and
 said connecting means maintaining said screw member in a fixed axial position with respect to said shaft.

7. A transmission comprising:
 first output means including a first member having a series of projections successively spaced apart along a closed first path;
 a plurality of screw members engaging said projections and adapted thereby to advance along said path in a screw-like manner, said screw members being disposed in end-to-end relationship along said path;
 input means for rotating said screw members about a common axis extending along said path, thereby to advance said screw members along said path;
 second output means including a plurality of output members; and
 means coupling said screw members to said output members for relative rotation between said output members and said screw members about said axis, whereby said output members are driven by said screw members substantially along said first path with respect to said first output means.

8. The combination defined in claim 7 in which said coupling means includes a shaft extending along said first path, and means connecting each of said screw members to said shaft for rotation around it, said connecting means maintain said screw members in fixed axial positions with respect to said shaft, and
 said output members extend from said shaft from points between said screw members.

9. The combination defined in claim 7 in which each screw member has a periphery generally defining a helix having a plurality of turns, each of said members being flexible, whereby said periphery engages successive projections to provide the screw-like motion of said screw members.

10. The combination defined in claim 9 including teeth on the screw member peripheries, and said input means including a worm having a threaded surface engaging teeth on a plurality of said turns.

11. The combination defined in claim 9 including projections extending from said screw member peripheries, and said input means including means for directing a fluid against said projections to rotate said screw members.

12. A transmission comprising:
 first output means including a first member having a series of projections defining a helix-like groove system around and extending along a closed path;
 a plurality of screw members having peripheries interfitting with and engaging said projections and adapted thereby to advance along said path in a screw-like manner;
 a first shaft extending through said screw members and along said path;
 input means for rotating said crew members about said shaft, thereby to advance said screw members along said path;

means connecting each of said screw members to said shaft so as to provide rotation of said screw members on said shaft about said axis and axially fix said screw members with respect to said shaft; and second output means including a plurality of arms connected to said shaft between said screw members.

13. The combination defined in claim 12, in which said shaft and said path describe a circle, said output means including a gear concentric with said circle and spaced radially outwardly from said screw members, said arms being connected between said shaft and said gear.

14. The combination defined in claim 12, in which the axis of said first shaft substantially defines a circle, including a second shaft concentric with said circle and perpendicular to the plane thereof, said arms being connected between said first shaft and said second shaft.

15. The combination defined in claim 12, in which said shaft substantially describes a circle and each of said screw members defines a portion of a torus extending along said circle, and including gear teeth extending from said peripheries of said screw members, said input means including a worm coaxial with said circle having threads engaging said teeth, whereby rotation of said worm about the axis of said circle provide rotation of said screw members about said shaft.

16. The combination defined in claim 15, in which said worm has axially separated portions provided with different leads, and including means for axially moving said worm to bring said portions thereof alternately into engagement with said teeth.

17. A transmission comprising:

first output means including a first member having a series of projections successively spaced around a circle;

a plurality of helical members, each of said helical members having a plurality of turns engaging successive projections whereby rotation of said helical members advances them along said circle in a screwlike manner;

a first shaft extending through said helical members and along said circle;

a spoke extending from each of said turns towards said shaft;

hubs rotatable about said shaft and fixed to said spokes;

means restraining said hubs from axial movement along said shaft;

input means for rotating said helical members around said shaft; and second output means including arms extending from said shaft at points between said helical members.

18. The combination defined in claim 17, in which said projections define a helical groove system in said first member, and said spokes are staggered with respect to their angular positions around the circular axis of said shaft.

19. The combination defined in claim 17, in which each of said helical members is tapered so that each turn thereof has a greater thickness in the axial direction thereof at its inner peripheries than at its outer peripheries, and the difference between said thickness is such that each turn is in substantial contact with each adjacent turn in the same helical member along a line extending from the axis of said circle to said shaft.

20. The combination defined in claim 17, in which said shaft has a non-circular cross section, and including a plurality of spacers having apertures inter-fitting with said cross section of said shaft, each of said spacers having a first portion of relatively large diameter and a second portion of relatively small diameter, and said hubs being journaled on said second portions.

References Cited in the file of this patent

UNITED STATES PATENTS 2,850,914    Duff _____ Sept. 9, 1958